(12) United States Patent
Thaler

(10) Patent No.: US 7,501,005 B2
(45) Date of Patent: Mar. 10, 2009

(54) EXHAUST TREATMENT DEVICE HAVING SUBMERGED CONNECTING FLANGES

(75) Inventor: Dave Michael Thaler, Mossville, IL (US)

(73) Assignee: Caterpillar Inc., Peoria, IL (US)

( * ) Notice: Subject to any disclaimer, the term of this patent is extended or adjusted under 35 U.S.C. 154(b) by 466 days.

(21) Appl. No.: 11/067,055

(22) Filed: Feb. 28, 2005

(65) Prior Publication Data
US 2006/0191247 A1 Aug. 31, 2006

(51) Int. Cl.
B01D 46/00 (2006.01)
B01D 35/30 (2006.01)

(52) U.S. Cl. .................... 55/523; 55/385.3; 55/498; 55/502; 55/503; 55/524; 55/DIG. 5; 55/DIG. 10; 55/DIG. 30; 95/273; 60/297; 60/299; 60/311; 422/169; 422/180; 285/420; 285/407

(58) Field of Classification Search ................ 55/385.3, 55/495, 498, 502, 503, 523, 524, DIG. 5, 55/DIG. 10, DIG. 30; 95/273; 60/295, 297, 60/299, 300, 303, 311; 422/168, 169, 177, 422/180; 285/420, 407
See application file for complete search history.

(56) References Cited
U.S. PATENT DOCUMENTS 4,032,310 A * 6/1977 Ignoffo ...................... 60/311
4,197,098 A * 4/1980 Stiehl et al. ................. 55/503
4,221,407 A 9/1980 Steimle
4,363,644 A * 12/1982 Sato et al. ................... 55/523
4,367,081 A * 1/1983 Harvey ....................... 55/503
4,503,672 A * 3/1985 Stark et al. .................. 60/311
5,080,953 A * 1/1992 Horikawa et al. ............ 55/523
5,924,282 A 7/1999 Thomas
6,293,098 B1 9/2001 Coates
6,576,045 B2 6/2003 Liu et al.
6,613,295 B1 9/2003 Kageyama et al.
6,632,406 B1 * 10/2003 Michelin et al. ............ 422/169
6,673,320 B1 1/2004 Tosa et al.
6,840,975 B2 1/2005 Bohacik
7,152,887 B2 * 12/2006 Pirrone ..................... 285/420
2004/0088959 A1 * 5/2004 Saito et al. .................. 55/523
2006/0053779 A1 * 3/2006 Belisle et al. ............... 60/299

* cited by examiner

Primary Examiner—Jason M Greene
(74) Attorney, Agent, or Firm—Finnegan, Henderson, Farabow, Garrett & Dunner

(57) ABSTRACT

An exhaust treatment device is provided for a power system. The exhaust treatment device has an inlet module, a filter module, an outlet module, and a clamping element. The filter has a housing with at least one submerged flange. At least one of the inlet and the outlet modules also have at least one submerged flange. The clamping element is configured to engage the at least one submerged flange of the filter module and the at least one submerged flange of the at least one of the inlet and the outlet modules to connect the filter module to the at least one of the inlet and outlet modules.

23 Claims, 2 Drawing Sheets

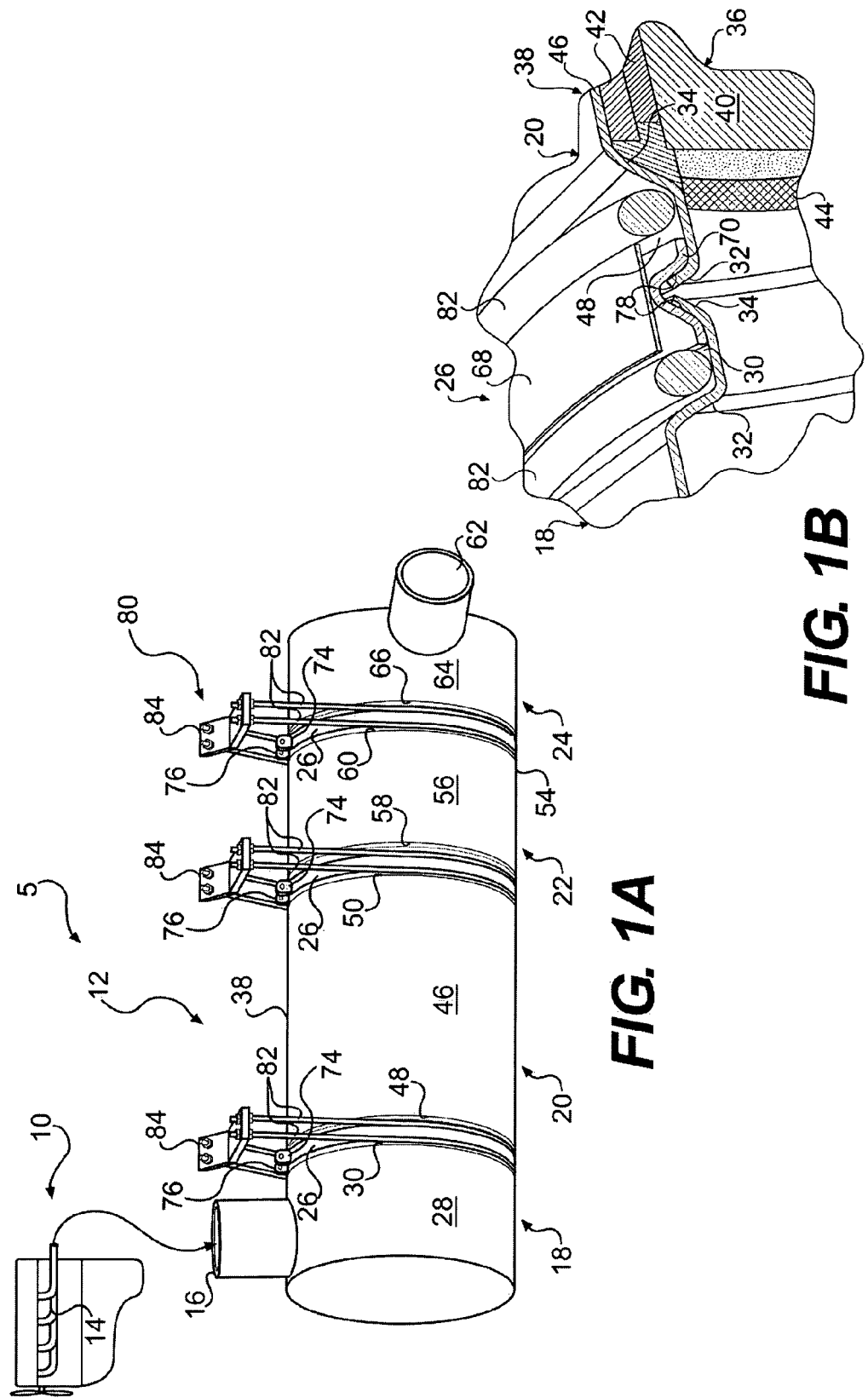

EXHAUST TREATMENT DEVICE HAVING SUBMERGED CONNECTING FLANGES

TECHNICAL FIELD

This disclosure relates generally to an exhaust treatment device and, more particularly, to an exhaust treatment device having submerged connecting flanges.

BACKGROUND

Internal combustion engines, including diesel engines, gasoline engines, gaseous fuel-powered engines, and other engines known in the art may exhaust a complex mixture of air pollutants. The air pollutants may be composed of gaseous compounds, which may include nitrogen oxides and carbon monoxide, and solid particulate matter, which may include unburned carbon particulates called soot.

Due to increased awareness of the environment, exhaust emission standards have become more stringent, and the amount of gaseous compounds and particulates emitted from an engine may be regulated depending on the type of engine, size of engine, and/or class of engine. One method that has been implemented by engine manufacturers to comply with the regulation of emissions has been to remove the gaseous compounds and particulate matter from the exhaust flow of an engine using an exhaust treatment device. An exhaust treatment device may include a filter assembly designed to trap particulate matter, a catalyst, an inlet member to direct exhaust flow through the filter assembly, and an outlet member to direct the exhaust flow away from the filter assembly.

Various filter assemblies may be implemented to reduce the emission of gaseous compounds and/or particulate matter. For example, U.S. Pat. No. 6,576,045 (the '045 patent) issued to Liu et al. on Jun. 10, 2003, describes a particulate collection system that includes an inlet section, a plurality of intermediate sections having porous media and metal screens, and an outlet section. The inlet, intermediate, and outlet sections have protruding mating flanges secured to each other by bolts.

Although the particulate collection system of the '045 patent may remove particulates from an exhaust flow of an engine, it may be large, difficult to package, and have a limited flow area. In particular, the space on an engine or within a work machine is generally limited, and the mounting flanges of the particulate collection system of the '045 patent being externally located increases the overall diameter of the particulate collection system. Because of the increased diameter, the particulate collection system may be difficult to mount within the available space on the engine or work machine. In addition, because the mounting flanges consume available space on the engine or work machine, the internal flow area of the particulate collection system may be reduced to reserve clearance for the protruding mounting flanges. The reduction in flow area could result in efficiency losses of the engine connected to the particulate collection system.

The disclosed exhaust treatment device is directed to overcoming one or more of the problems set forth above.

SUMMARY OF THE INVENTION

In one aspect, the present disclosure is directed to a filter module that includes a filter element and a filter housing. The filter housing includes a sleeve portion, a first end portion, and a second end portion. At least one of the first end portion and the second end portion has at least one submerged flange.

In yet another aspect, the present disclosure is directed to an exhaust treatment device. The exhaust treatment device includes an inlet module, a filter module, an outlet module, and a clamping element. The filter module has a housing with at least one submerged flange. At least one of the inlet and the outlet modules also have at least one submerged flange. The clamping element is configured to engage the at least one submerged flange of the filter module and the at least one submerged flange of the at least one of the inlet and the outlet modules to connect the filter module to the at least one of the inlet and outlet modules.

In yet another aspect, the present disclosure is directed to a method of assembling a filter module. The method includes forming a submerged flange on a first end of a cylindrical sleeve, inserting a filter element into the cylindrical sleeve, and forming a submerged flange on a second end of the cylindrical sleeve. The submerged flange on the first end of the cylindrical sleeve and the submerged flange on the second end of the cylindrical sleeve axially retain the filter element within the cylindrical sleeve.

BRIEF DESCRIPTION OF THE DRAWINGS

FIG. 1A is a pictorial illustration of an exhaust treatment device according to an exemplary disclosed embodiment;

FIG. 1B is a cutaway illustration of a portion of the exhaust treatment device of FIG. 1A.

DETAILED DESCRIPTION

Figures 2A, 2B, 2C, 2D, 2E, 2F:
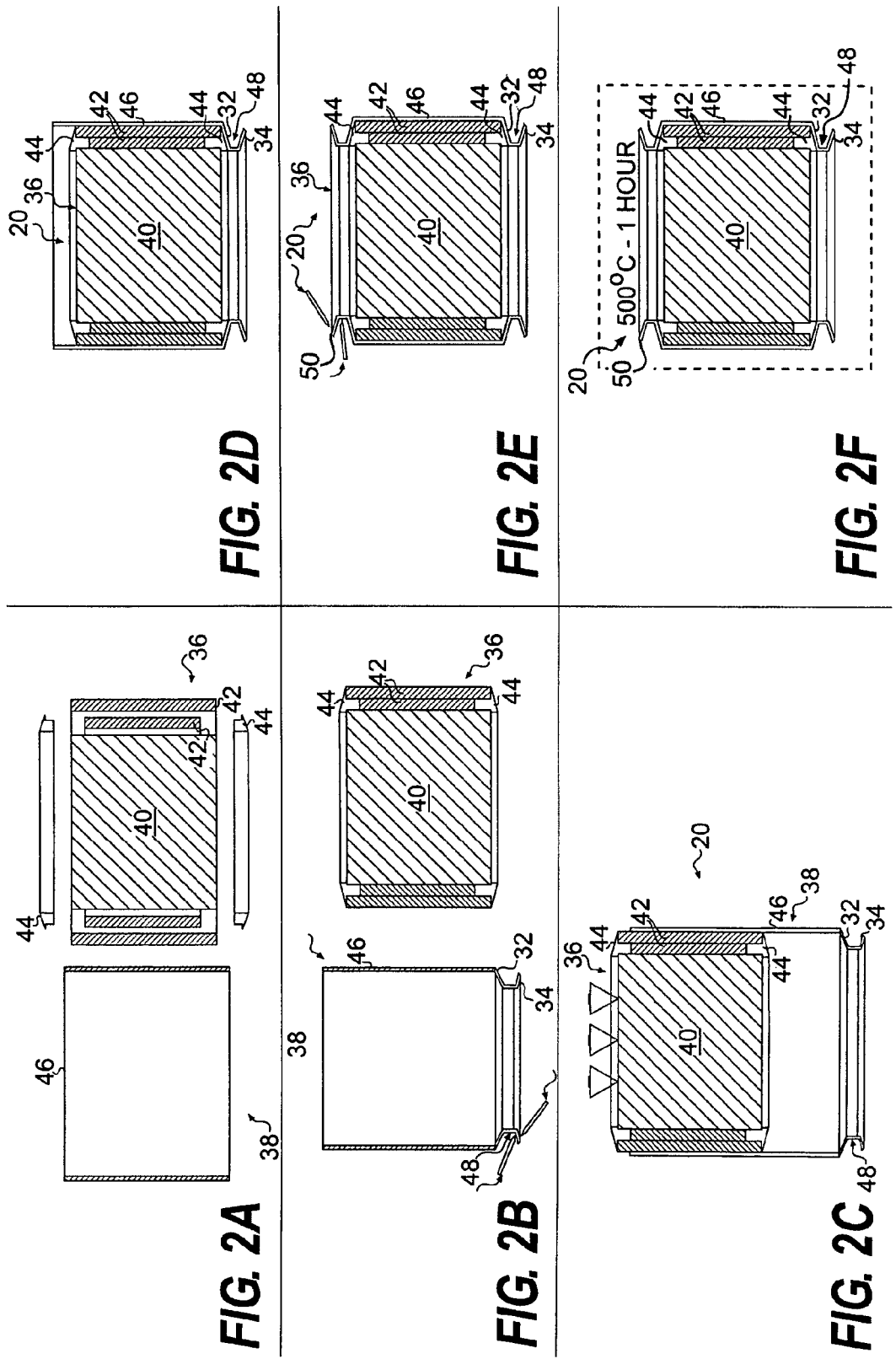
FIGS. 2A-F illustrate steps of an exemplary disclosed method for fabricating a filter module of the exhaust treatment device of FIG. 1.

FIG. 1A illustrates a power system 5 having an engine 10 connected to exemplary embodiment of an exhaust treatment device 12. Power system 5 may generate a power output as part of a work machine that performs some type of operation associated with an industry such as mining, construction, farming, transportation, power generation or any other industry known in the art. For example, power system 5 may embody the primary mover for a mobile machine such as an excavator, a dump truck, a backhoe, a bus, a marine vessel, or any other mobile machine known in the art. Alternatively, power system 5 may embody the primary power source in a stationary machine such as a generator set, a pump, or any other stationary machine known in the art.

For the purposes of this disclosure, engine 10 is depicted and described as a four-cylinder diesel engine. One skilled in the art will recognize, however, that engine 10 may be any other type of internal combustion engine such as, for example, a gasoline or a gaseous fuel-powered engine. Further, engine 10 may include any number of cylinders disposed in an in-line configuration, a "V" configuration, or any other suitable configuration. Engine 10 may include an exhaust manifold 14 connecting the exhaust flow of engine 10 with an inlet 16 of exhaust treatment device 12.

Exhaust treatment device 12 may be configured to receive emissions from engine 10 and to remove particulates and/or gaseous compounds from the emissions before exhausting the emissions into the atmosphere. Exhaust treatment device 10 may include an inlet module 18, a filter module 20, a catalyst module 22, and an outlet module 24 connected to each other by a plurality of clamping elements 26. It is contemplated that exhaust treatment device 12 may include a greater or lesser number of modules, and/or different types of modules.

Inlet module 18 may include components disposed downstream of engine 10 to receive the flow of exhaust from engine 10 and to direct the flow of exhaust to filter module 20. In particular, inlet module 18 may include inlet 16 configured to receive the exhaust flow from engine 10, a main chamber 28, and a submerged connecting flange 30.

Inlet 16 may have a substantially circular cross-section. It is also contemplated that inlet 16 may have a differently shaped cross-section such as oval, square, rectangular, triangular, or any other suitable cross-section. Inlet 16 may protrude from a first end of inlet module 18 in a radial direction of inlet module 18. It is contemplated that inlet 16 may alternatively protrude from an axial direction, a tangential direction, or any other suitable direction relative to inlet module 18.

Main chamber 28 may be located between inlet 16 and submerged connecting flange 30 and may have a substantially circular-shaped cross-section along a length direction. It is also contemplated that main chamber 18 may have a cross-sectional shape other than circular such as, for example, oval, square, rectangular, or another appropriate shape.

Submerged connecting flange 30 may have a substantially circular shape. For the purposes of this disclosure, the term submerged connecting flange may be defined as a connecting flange having a diameter less than a diameter of an adjacent element, such as, for example main chamber 28 illustrated in FIG. 1B. Submerged connecting flange 30 may having a transition side wall 32 and an end wall 34. Transition side wall 32 may embody an annular member that joins the larger diameter of main chamber 18 to the smaller diameter of submerged connecting flange 30. It is contemplated that transition side wall 32 may be angled relative to the cylindrical surfaces of main chamber 28 or, alternatively, may be orthogonal relative to the cylindrical surface. End side wall 34 may embody an annular member disposed either orthogonally or angularly relative to the cylindrical surfaces of main chamber 28 and opposite to transition side wall 32 for engagement with clamping element 26. Submerged connecting flange 30 may be integral to main chamber 18 and formed through a bending fabrication process such as, for example, a roll-forming process, a spin-forming process or any other appropriate fabrication process. It is contemplated that transition side wall 32 and end wall 34 may alternatively be initially separate from main chamber 18 and joined to main chamber 18 by way of welding, fastening, adhesive application, or in other suitable manner.

Filter module 20 may be disposed between inlet module 18 and catalyst module 22, and may include components that function to treat exhaust as it is flows through exhaust treatment device 12. Specifically, exhaust emissions may enter exhaust treatment device 12 via inlet module 18 and flow through a filter assembly 36 retained within a housing 38 of filter module 20. It is contemplated that one or more of filter assemblies 36 may alternatively be arranged to receive the gaseous emissions in series or parallel relation. The number of filter assemblies 36 within exhaust treatment device 12 may be variable and depend on the back pressure, filtration, and size requirements of a particular application.

Filter assembly 36 may include components for removing particulate matter from the flow of exhaust and for positioning purposes, and for shielding purposes. Specifically, filter assembly 36 may include a particulate filtration medium 40, one or more mat members 42, and one or more gasket members 44.

Particulate filtration medium 40 may be configured to remove particulate matter from the exhaust flow. Specifically, particulate filtration medium 40 may embody a generally cylindrical deep bed type filtration medium configured to accumulate particulate matter throughout a thickness of particulate filtration medium 40 in a substantially homogeneous manner. Particulate filtration medium 40 may include a low density material having a flow entrance side and a flow exit side. The low density material may be formed through a sintering process from metallic or ceramic particles. It is contemplated that the density of the material may be inconsistent, with a density at a peripheral boundary of the material being greater to provide strength to particulate filtration medium 40. It is also contemplated that particulate filtration medium 40 may alternatively embody a surface type filtration ceramic medium, a wire mesh medium, or any other suitable filtration medium.

Mat members 42 may be configured to position particulate filtration medium 40. Specifically, mat members 42 may be formed from a ductile high-temperature ceramic material such as, for example, an alumina silicate material that expands when heated. Mat members 42 may be wrapped around particulate filtration medium 40 prior to insertion into housing 38, and then heated while within housing 38 causing expansion of mat members 42. The expansion of mat members 42 between an outer annular surface of particulate filtration medium 40 and an inner annular surface of housing 38 may function to radially position filtration medium 40 within housing 38.

Gasket members 44 may be configured to shield mat members 42 from the flow of exhaust. In one example, a gasket member 44 may be disposed at each end of housing 38 to shield an end of mat members 42 that is left exposed to the exhaust flow by particulate filtration medium 40. Gasket members 44 may shield mat members 42 from exhaust flow to minimize erosion of mat members 42 that could cause displacement of particulate filtration medium 40. Gasket members 44 may include a metal mesh type gasket, a graphite type gasket, a foil type gasket, or any other type of high-temperature gasket that may function to minimize exposure of mat members 42 to the flow of exhaust. During assembly, end wall 34 may function to compress gasket members 44 thereby axially restraining particulate filtration medium 40.

Housing 38 may include components configured to axially retain particulate filtration medium 40 and to connect filter module 20 to inlet module 18. In particular, housing 38 may include a cylindrical sleeve 46, a first submerged connecting flange 48 and a second submerged connecting flange 50. First and second submerged connecting flanges 48 and 50 may be substantially identical to submerged connecting flange 30, connected to opposite ends of cylindrical sleeve 46 by way of transition side walls 32, and may include end walls 34. First and second submerged connecting flanges 48, 50, transition side walls 32, and end walls 34 may be integral to cylindrical sleeve 46 and formed through a roll-forming process, a spin-forming process, or any other appropriate fabrication process. It is contemplated that transition side walls 32 and end walls 34 may alternatively be initially separate from cylindrical sleeve 46 and joined to cylindrical sleeve 46 by way of welding, fastening, adhesive application, or in other suitable manner.

Catalyst module 22 may be disposed between filter module 20 and outlet module 24, and may include components that function to treat exhaust as it is flows from filter module 20. Specifically, exhaust emissions now substantially free of particulate matter may flow from filter module 20 through a catalyst medium (not shown) that is retained within a housing 54 of catalyst module 22. It is contemplated that one or more catalyst mediums may alternatively be arranged to receive the gaseous emissions in series or parallel relation. The number of catalyst mediums within exhaust treatment device 12 may be variable and depend on the back pressure, filtration, and size requirements of a particular application. It is contemplated that catalyst module 22 may alternatively be located upstream of filter module 20.

The catalyst medium may include, for example, a foam material having a catalyst configured to react with the exhaust flow entering catalyst module 22. The foam material may be formed from sintered metallic particles such as, for example, alumina, titania, or any other high-temperature alloy. The foam material may also be formed from ceramic particles such as, for example, silicon carbide, cordierite, mullite, or any other ceramic particles known in the art. The foam material may be formed into a filter medium through a casting process, an injection molding process, or any other process that produces a porous material with a desired porosity. A catalyst may be incorporated throughout the foam material and may be configured to reduce an amount of nitrogen oxide in the flow of exhaust, to decrease an oxidation temperature of the particulate matter trapped by particulate filtration medium 40, to reduce an amount of carbon monoxide in the flow of exhaust, and/or to reduce an amount of unburned hydrocarbons in the flow of exhaust. The catalyst may include, for example, an oxidation catalyst, an SCR catalyst, an HC-DeNOx catalyst, or any other appropriate type of catalyst. It is contemplated that the catalyst medium may alternatively include a wire mesh material having a catalyst coating. It is further contemplated that catalyst module 22 may be omitted, if desired, and a catalyst coating applied to particulate filtration medium 40 and/or to walls within exhaust treatment device 12.

Housing 54 may be substantially identical to housing 38 in that housing 54 includes a cylindrical sleeve 56, a first submerged connecting flange 58, and a second submerged connecting flange 60. First and second submerged connecting flanges 58, 60 may be substantially identical to submerged connecting flange 30, connected to opposite ends of cylindrical sleeve 56 by way of transition side walls 32, and may include and end walls 34. Transition side walls and end walls 32, 34 may be integral to cylindrical sleeve 56 and formed through a roll-forming process, a spin-forming process, or any other appropriate fabrication process. It is contemplated that transition side wall 32 and end wall 34 may alternatively be initially separate from cylindrical sleeve 56 and joined to cylindrical sleeve 56 by way of welding, fastening, adhesive application, or in other suitable manner.

Outlet module 24 may include components disposed downstream of filter and catalyst modules 20, 22 to direct the treated flow of exhaust to the atmosphere. In particular, outlet module 24 may include an outlet 62, a main chamber 64, and a submerged connecting flange 66 that may be substantially identical to submerged connecting flange 30.

Outlet 62 may have a substantially circular cross-section. It is also contemplated that outlet 62 may have a differently shaped cross-section such as oval, square, rectangular, triangular, or any other suitable cross-section. Outlet 62 may protrude from a first end of outlet module 24 in a radial direction of outlet module 24. It is contemplated that outlet 62 may alternatively protrude from an axial direction, a tangential direction, or any other suitable direction relative to outlet module 24.

Main chamber 64 may be located between outlet 62 and submerged connecting flange 66, and may have a substantially circular-shaped cross-section along a length direction. It is also contemplated that main chamber 64 may have a cross-sectional shape other than circular such as, for example, oval, square, rectangular, or another appropriate shape.

Clamping element 26 may be tightened to join the modules of exhaust treatment device 12. As illustrated in FIG. 1A, clamping element 26 may include a tightening device (not shown) configured to draw a first flanged end 74 of clamping element 26 toward a second flanged end 76. The tightening device may be disposed between and/or through first and second flanged ends 74, 76 and configured to bring first and second flanged ends 74, 76 toward each other. For example, tightening device may include a threaded fastener and engaging nut, a hinged lever, or any other type of tightening device known in the art. As first and second flanged ends 74 and 76 are brought toward each other the diameter of clamping element 26 may be reduced. As illustrated in FIG. 1B, clamping element 26 may also include a band portion 68, and a "V" portion 70. "V" portion 70 may be configured for placement over end walls 34 of two adjacent modules of exhaust treatment device 12, and may include inner angled surfaces 78 that urge the two adjacent end walls 34 toward each other as the diameter of clamping element 26 is reduced.

A sealing device (not shown) may be included within exhaust treatment device 12 for sealing inlet module, filter module, catalyst module, and outlet module together. The sealing device may include, for example, a ceramic paste, a compression of a portion of end walls 34, a graphite or foil gasket, or any other means known in the art. The sealing device may be disposed between two adjacent end walls 34, between end walls 34 and clamping element 26, or in any other appropriate position within exhaust treatment device 12. In this manner, exhaust flow from engine 10 may be directed through exhaust treatment device 12 with minimal leakage.

Referring to FIG. 1A, a restraint system 80 may be implemented to attach exhaust treatment device 12 to power system 5 or to a portion of the work machine. In one example, restraint system 80 includes a plurality of curved rods 82. One curved rod 82 may be disposed within each submerged connecting flange of exhaust device 12 and in contact with a majority of the periphery of the associated submerged connecting flange. Each curved rod 82 may have two threaded ends configured for fastening to a flange member 84 that is fixedly connected to power system 5 or to the portion of the work machine. Adjacent curved rods 82 may be connected to a single common flange member 84.

FIGS. 2A-F illustrate steps of an exemplary method for fabricating and assembling filter module 20. FIGS. 2A-F will be discussed in detail in the following section.

INDUSTRIAL APPLICABILITY

The disclosed exhaust treatment device may be applicable to any combustion-type system such as, for example, an engine, a furnace, or any other system known in the art where the removal of gaseous compounds and/or particulate matter from an exhaust flow is desirable. It is also contemplated that the disclosed exhaust treatment device may also be used with a non-combustion type system such as, for example, a dust collection system. Exhaust treatment device 12 may maximize flow area for a given available space, while providing a simple and inexpensive method of retaining a filter medium. Operation of exhaust treatment device 12 will now be explained.

According to the exemplary embodiment of FIG. 1A, exhaust flow may be directed into exhaust treatment device 12 through inlet module 18 and out of exhaust treatment device 12 via outlet module 24. Specifically, the exhaust flow may be directed from inlet 16, through main chamber 28, and into filter module 20. Particulate matter may be removed from the exhaust flow by filtration medium 40 before being directed into catalyst module 22 for further treatment. The now treated flow of exhaust may exit outlet module 24 into the atmosphere via outlet 62.

Air flow through exhaust treatment device 12 may be improved because the cross-sectional area of exhaust treatment device is maximized for a given available space. Specifically, because the submerged connecting flanges are recessed rather than protruding away from exhaust treatment device 12, the diameter of the modules of exhaust treatment device 12 may be enlarged to the diameter of the available space without having to reserve space for protruding connecting flanges. The enlarged diameter equates to a larger flow area for exhaust from engine 10 and to a reduction in engine backpressure.

Inspection and maintenance time and cost of exhaust treatment device 12 may be reduced because the individual modules of exhaust treatment device 12 are accessible while exhaust treatment device 12 remains connected to power system 5 or the work machine. In particular, because the modules of exhaust treatment device 12 are joined by abutting end walls 34 of adjacent modules, and because a different curved rod 82 supports each submerged connecting flange of exhaust treatment device 12, each module may be independently removed, replaced, and/or serviced while the remaining modules stay connected to power system 5 or a frame of the work machine. For example, filter module 20 may require periodic replacement. To replace filter module 20, instead of completely removing exhaust treatment device 12 and completely disassembling all of the modules to access filter module 20, only one curved rod 82 at each end of filter module 20 must be removed. Once curved rods 82 are removed from submerged flanges 48 and 50 of filter module 20, filter module 20 can be removed from exhaust treatment device and replaced or maintained while the remaining modules of exhaust treatment device 12 remain securely connected to engine 10 or the work machine.

Because filter assembly 36 is retained by ends of cylindrical sleeve 46 that are fabricated through the roll or spin-forming processes, assembly time and cost may be reduced. In particular, because the fabricated submerged connecting flanges 48, 50 of filter module 20 axially retain filter assembly 36, no retaining hardware or installation of retaining hardware is necessary. The assembly of filter assembly 36 within housing 38 will now be described with respect to FIG. 2.

FIG. 2A illustrates the starting components that will be assembled to produce filter module 20. As described above, these components include housing 38, particulate filtration medium 40, mat members 42, and gasket members 44. FIG. 2B illustrates the fabrication of first submerged connecting flange 48 from cylindrical sleeve 46, and the sub-assembly of particulate filtration media 40, mat members 42, and gasket members 44. FIG. 2C illustrates the sub-assembly generated in FIG. 2B is placed within cylindrical sleeve 46. FIG. 2D illustrates the abutment of the sub-assembly with the newly-formed first submerged connecting flange 48. FIG. 2E includes the fabrication of second submerged connecting flange 50 in the same manner as first submerged connecting flange 48. As second submerged connecting flange 50 is fabricated, the sub-assembly may be pressed into cylindrical sleeve 46, thereby axially retaining particulate filtration media 40, mat members 42, and gasket members 44. FIG. 2F illustrates the final step of assembly that includes baking or otherwise heating filter module 20 for about 1 hour at about 500° C. to cause expansion of mat members 42, thereby radially positioning particulate filtration medium 40. It is contemplated that filter module may be baked or otherwise heated at a different temperature and/or for a different period of time, depending on the composition of mat members 42.

It will be apparent to those skilled in the art that various modifications and variations can be made to the disclosed exhaust treatment device without departing from the scope of the disclosure. Other embodiments of the exhaust treatment device will be apparent to those skilled in the art from consideration of the specification and practice of the invention disclosed herein. It is intended that the specification and examples be considered as exemplary only, with a true scope of the disclosure being indicated by the following claims and their equivalents.

What is claimed is:

1. A filter module, comprising:
   a filter element; and
   a filter housing, the filter housing including:
      a sleeve portion;
      a first end portion; and
      a second end portion,
   wherein each of the first and second end portions have at least one submerged flange,
   wherein the at least one submerged flange of the first and second end portions axially retain the filter element within the sleeve portion, and
   wherein the first end portion and the second end portion are integral to the sleeve portion and the submerged flanges are formed by bending ends of the sleeve portion.

2. The filter module of claim 1, further including at least one mat member disposed radially between the filter element and the sleeve portion.

3. The filter module of claim 2, further including a gasket member disposed at axial ends of the at least one mat member.

4. An exhaust treatment device, comprising:
   an inlet module;
   a filter module having a housing, including
      a first end portion,
      a second end portion, and
      a filter element,
      wherein each of the first and second end portions has at least one submerged flange;
   an outlet module; and
   a first clamping element,
   wherein the at least one submerged flange of the first end portion and the at least one submerged flange of the second end portion axially retain the filter element within the housing of the filter module, and
   wherein at least one of the inlet and the outlet modules have at least one submerged flange, and the first clamping element is configured to engage at least one of the submerged flanges of the filter module and the at least one submerged flange of the inlet and outlet modules to connect the filter module to the at least one of the inlet and outlet modules.

5. The exhaust treatment device of claim 4, further including:
   a catalyst module having a housing with at least one submerged flange and being disposed between the filter module and one of the inlet and outlet modules; and
   a second clamping element
   wherein the second clamping element is configured to engage a second submerged flange of the housing of the filter module and the at least one submerged flange of the catalyst module to connect the filter module to the catalyst module.

6. The exhaust treatment device of claim 4, further including:
   at least one mat member disposed radially between the filter element and the housing of the filter module; and a gasket member disposed at each axial end of the at least one mat member.

7. The exhaust treatment device of claim 4, further including a retaining system having:
   a first rod member configured to engage at least one of the submerged flanges of the filter module; and
   a second rod member configured to engage the at least one submerged flange of the at least one of the inlet and outlet modules to constrain the movement of the exhaust treatment device.

8. The exhaust treatment device of claim 7, wherein the first rod member annularly contacts a majority of the periphery of the at least one submerged flange of the filter module and the second rod member annularly contacts a majority of the periphery of the at least one submerged flange of the at least one of the inlet and outlet modules.

9. The exhaust treatment device of claim 8, wherein each of the first and second rod members includes a first end and a second end, and the exhaust treatment device further includes a flange member connected to the first and second ends of both of the first and second rod members.

10. The exhaust treatment device of claim 7, wherein any one of the inlet module, fitter module, and outlet module is removable from the exhaust treatment device while the remaining modules of the exhaust treatment device remain substantially constrained from movement.

11. A method of assembling a filter module, comprising:
   forming a submerged flange on a first end of a cylindrical sleeve;
   inserting a filter element into the cylindrical sleeve; and
   forming a submerged flange on a second end of the cylindrical sleeve to axially retain the filter element within the cylindrical sleeve,
   wherein the first and second submerged flanges are formed from end portions of the cylindrical sleeve through at least one of a roll-forming and a spin-forming fabrication process.

12. The method of claim 11, further including disposing a mat between an outer surface of the filter element and an inner surface of the cylindrical sleeve.

13. The method of claim 12, further including heating the filter module to cause the mat to expand and radially position the filter element.

14. The method of claim 13, wherein heating includes raising the temperature of the filter module to about 500° C. and maintaining the temperature at about 500° C. for about one hour.

15. The method of claim 11, further including disposing a gasket element at each end of the filter module.

16. A power system, comprising:
   an engine operable to produce an exhaust air flow;
   an exhaust treatment device operatively connected to the engine and configured to receive the exhaust air flow, the exhaust treatment device including:
      an inlet module;
      a filter module having a housing, including
         a first end portion,
         a second end portion, and
         a filter element,
         wherein each of the first and second end portions has at least one submerged flange;
      an outlet module; and
      a clamping element,
      wherein the at least one submerged flange of the first end portion and the at least one submerged flange of the second end portion axially retain the filter element within the housing of the filter module, and
      wherein at least one of the inlet and the outlet modules have at least one submerged flange, and the clamping element is configured to engage at least one of the submerged flanges of the filler module and the at least one submerged flange of the inlet and outlet modules to connect the filter module to the at least one of the inlet and outlet modules.

17. The power system of claim 16, further including:
   a catalyst module having a housing with at least one submerged flange and being disposed between the filter module and one of the inlet and outlet modules; and
   a second clamping element,
   wherein the second clamping element is configured to engage a second submerged flange of the housing of the filter module and the at least one submerged flange of the catalyst module to conned the filter module to the catalyst module.

18. The power system of claim 16, wherein the filter module includes:
   at least one mat member disposed radially between the filter element and the housing of the filter module; and
   a gasket member disposed at each axial end of the at least one mat member.
   wherein the submerged flanges of the filter module retain the filter element, mat member, and gasket member within the housing of the filter module.

19. The power system of claim 16, further including a retaining system having:
   a first rod member configured to engage at least one of the submerged flanges of the filter module, and having a first and a second end;
   a second rod member configured to engage the at least one submerged flange of the at least one of the inlet and outlet modules to constrain the movement of the exhaust treatment device, and having a first and a second end; and
   a flange member connected to the first and second ends of both of the first and second rod members,
   wherein the first rod member annularly contacts a majority of the periphery of the at least one submerged flange of the filter module and the second rod member annularly contacts a majority of the periphery of the at least one submerged flange of the at least one of the inlet and outlet modules.

20. The power system of claim 16, wherein any one of the inlet module, filter module, and outlet module is removable from the exhaust treatment device while the remaining modules of the exhaust treatment device remain constrained from movement.

21. A filter module, comprising:
   a filter element; and
   a filter housing, the filter housing including:
      a sleeve portion;
      a first end portion; and
      a second end portion,
      wherein each of the first and second end portions have at least one submerged flange,
      wherein the at least one submerged flange of the first and second end portions axially retain the filter element within the sleeve portion, and
      wherein the first end portion and the second end portion are integral to the sleeve portion.

22. The filter module of claim 21, further including at least one mat member disposed radially between the filter element and the sleeve portion.

23. The filter module of claim 22, further including a gasket member disposed at axial ends of the at least one mat member.

* * * * *